US006401690B1

(12) United States Patent
Kowatari et al.

(10) Patent No.: US 6,401,690 B1
(45) Date of Patent: Jun. 11, 2002

(54) ELECTRIC-CONTROL-TYPE THROTTLE APPARATUS

(75) Inventors: Takehiko Kowatari, Kashiwa; Yuzo Kadomukai, Ishioka; Shigeru Tokumoto, Hitachinaka; Yasuo Saito, Hitachinaka; Toshifumi Usui, Hitachinaka; Masaru Ito, Hitachinaka, all of (JP)

(73) Assignees: Hitachi, Ltd., Tokyo; Hitachi Car Engineering Co., Ltd., Ibaraki, both of (JP)

( * ) Notice: Subject to any disclaimer, the term of this patent is extended or adjusted under 35 U.S.C. 154(b) by 0 days.

(21) Appl. No.: 09/614,207

(22) Filed: Jul. 11, 2000

Related U.S. Application Data

(62) Division of application No. 09/176,877, filed on Oct. 21, 1998, now Pat. No. 6,098,594.

(30) Foreign Application Priority Data

Oct. 21, 1997 (JP) ............................................ 9-288208

(51) Int. Cl.[7] .......................... F02D 9/10; F02D 11/10; H02K 23/00

(52) U.S. Cl. ...................................... 123/399; 318/254

(58) Field of Search ................................ 123/361, 399; 180/179; 318/254, 599

(56) References Cited

U.S. PATENT DOCUMENTS

| | | | | |
|---|---|---|---|---|
| 4,955,346 | A | 9/1990 | Kaneyasu et al. | 123/399 |
| 5,406,920 | A | 4/1995 | Murata et al. | 123/399 |
| 5,818,178 | A | * 10/1998 | Marumoto et al. | 318/254 |
| 5,828,193 | A | 10/1998 | Furuta | 318/254 |

FOREIGN PATENT DOCUMENTS

| | | |
|---|---|---|
| JP | 8-177534 | 7/1996 |

* cited by examiner

*Primary Examiner*—Tony M. Argenbright
(74) *Attorney, Agent, or Firm*—Antonelli, Terry, Stout & Kraus, LLP

(57) ABSTRACT

An electrically-controlled throttle valve apparatus includes a motor, a speed reducing mechanism for reducing rotation speed transmitted from the motor, a throttle valve connected to the speed reducing mechanism, and a force applying device applying force to the throttle valve in the direction of returning the valve to its initial position and adjusting the opening of the throttle valve by driving the motor. Parameters of the motor, the speed reducing mechanism, and the force applying device have values such that the operation time t from the minimum to the maximum throttle valve opening, which is determined by an evaluation equation obtained from equations of throttle valve motion, is less than a prescribed target throttle valve operation time t*. Furthermore, resistance and an induction voltage constant of the motor are determined to satisfy a constraint equation obtained based on Ohm's law.

4 Claims, 9 Drawing Sheets

ELECTRIC-CONTROL-TYPE THROTTLE APPARATUS

CROSS-REFERENCE TO RELATED APPLICATION

This application is a division of application Ser. No. 09/176,877, filed on Oct. 21, 1998, now U.S. Pat. No. 6,098,594, the entire disclosure of which is hereby incorporated by reference.

BACKGROUND OF THE INVENTION

The present invention relates to an electric-control-type throttle apparatus for controlling the amount of intake air, used in an internal combustion engine.

Japanese Patent Publication 177534/1996 discloses a throttle valve control apparatus including a throttle body, a throttle valve installed in the air intake path of the throttle body via a rotatable shaft, an actuator for driving the throttle valve via a plurality of gears, and a detection means for detecting the rotation angle of the throttle valve.

The plurality of gears of this apparatus is composed of the first gear fixed to the shaft of the throttle valve, the third gear fixed to the rotation shaft of the motor used as the actuator, and the second gear between the first and third gears. This composition can increase the speed reducing ratio, which can finely control the opening of the throttle valve.

Although the opening of the throttle valve can be finely controlled by obtaining a large gear ratio in the above-mentioned conventional throttle apparatus, it is not stated how to determine the characteristics of the motor, or the gear ratio with which the torque of the motor is transmitted to the throttle valve in order to realize the desired operation speed of the throttle valve.

In the above conventional apparatus, the throttle valve is opened or closed by the motor. If the opening or closing of the throttle valve does not respond quickly to the motion of the acceleration pedal operated by a driver, the driver notices the gap between the operations performed by the driver itself and changes in the operational state of the internal engine. However, in the electric-control-type throttle apparatus, it is necessary to provide a force applying means for quickly returning the position of the throttle valve to the predetermined opening in the event of a problem with the fail-safe operation. Therefore, the operation speed of the throttle valve cannot easily be increased, and it is important to adequately determine the force from the force applying means, the performance of the motor, and the speed reducing ratio of the rotation speed of the motor to that of the throttle valve.

If this conventional throttle apparatus is applied to a direct injection engine in which fuel is directly injected in each cylinder, the following problems will occur.

In a conventionally used port injection engine in which fuel is injected into an air intake pipe, the engine is operated near the theoretical air to fuel ratio of 14.7. On the other hand, a direct injection engine is operated in a wide range of an air to fuel ratio of 14.7 (theoretical ratio) to more than 40 (superlean ratio). Fuel burning near the theoretical air to fuel ratio is called the uniform mixture charge burning state, and fuel burning at an air to fuel ratio higher than the theoretical ratio is called the stratified charge burning state. It is easy to realize the stratified charge burning state in a direct injection engine because fuel is directly injected into a cylinder. FIG. 12 is a diagram showing the relationship between the fuel burning modes and operation states of an engine. The stratified charge burning mode is performed below an engine rotation speed of approximately 3000 rpm.

In implementing those burning modes, it is necessary to open the throttle valve wider in the stratified charge burning state than in the uniform mixture charge burning state. Therefore, when the operation of the engine is changed from the stratified charge burning state to the uniform mixture charge burning, the throttle valve is driven in the valve closing direction. FIG. 4A and FIG. 4B show changes in time of the actuating amount of an acceleration pedal and changes in time of the opening of the throttle valve corresponding to the changes of the actuating amount of the acceleration pedal, respectively.

As shown in FIG. 4B, the throttle valve is widely opened in the stratified charge burning state, and it is driven once in the valve closing direction when the operation of the engine is switched to the uniform mixture charge burning state. If the time necessary for the switching operation is long, the switching operation between the two burning states cannot be smoothly carried out, and the output power of the engine rapidly changes. Consequently, a shock caused by the switching operation is transmitted to the passengers and the driver of the vehicle, which degrades both the operationality of the vehicle and the comfort of riding in the vehicle.

On the other hand, if the throttle valve is driven at a high speed, it is also necessary to rotate the motor driving the throttle valve at a high speed. In these high speed operations, the higher speed the motor is rotated at, the larger the counter-electromotive force for braking the rotation of the throttle valve becomes. Therefore, there may be a large current that is beyond the permitted value for the switching elements used in a drive circuit for driving the motor. It is then necessary to use switching elements with the higher permitted current value for the drive circuit of the motor. However, switching elements with the required larger permitted current cannot be always acquired. Even though switching elements with the required larger permitted current can be acquired, such elements are very expensive and unsuitable for use in a vehicle. For another means for restricting the value of the current flowing in the drive circuit of the motor below the permitted current value, it is also possible to provide a current limiting circuit in the drive circuit. However, this means increases the production cost, and if the provided current limiting circuit breaks down, it is possible that the increased current cannot be kept below the permitted current value. Thus, this means does not offer a sufficient fail-safe function.

SUMMARY OF THE INVENTION

An objective of the present invention is to realize a highly reliable electric-control-type throttle apparatus capable of performing the usual opening and closing operations and offering a fail-safe function of securing the position of a throttle valve at which a vehicle can be safely driven at an appropriate operation speed even in the event of a failure of the motor for driving the throttle valve.

The first feature of the present invention designed to attain the above objective is to provide an electric-control-type throttle apparatus including a motor, a speed reducing mechanism for reducing the rotation speed that is transmitted from the rotation speed of the motor, a throttle valve connected to the speed reducing mechanism, and a force applying means for applying force to the throttle valve towards returning the valve to its initial position, for adjusting the opening of the throttle valve by driving the motor; wherein the specification parameters of the motor, the speed reducing mechanism, and the force applying means have their values such that the operation time t from the minimum opening to the maximum opening of the throttle valve, which is determined by the following equation (1):

$$t = \sqrt{\frac{\pi}{\frac{(T_{\max} N - T_s)}{J}}}, \quad (1)$$

where $T_{max}=K_m E/R_m$, and $T_s$: the preload of a return spring of the force applying means [Nm], $T_{max}$: the torque of the motor [NM], N: the speed reducing ratio, J: the equivalent moment of inertia [$kgm^2$], $K_m$: the torque constant [Nm/A], $R_m$: the impedance of the motor [Ω], and E: the voltage applied to the motor [V], is shorter than a prescribed target operation time t*.

The second feature of the present invention is that, in the above electric-control-type throttle apparatus of the first feature, the target operation time t* is 80 ms.

The third feature of the present invention is that, in the above electric-control-type throttle apparatus of the second feature, the values of the specification parameters are those at the temperature of 120° C.

The fourth feature of the present invention is that, in the above electric-control-type throttle apparatus of the second feature, the applied voltage is approximately 13 V.

The fifth feature of the present invention is that, in the above electric-control-type throttle apparatus of the second feature, the torque constant $K_m$ is 0.035±0.0035 Nm/A, the resistance of the motor $R_m$ is 1.6±0.1 Ω, and the speed reducing ratio N is from 9.8 to 10.8, preferably 10.3 at the temperature 20° C.

The sixth feature of the present invention is that, in the above electric-control-type throttle apparatus of the fifth feature, the preload torque $T_s$ of the return spring is from 0.3 to 0.4 Nm, preferably 0.35 Nm.

The seventh feature of the present invention is that, in the above electric-control-type throttle apparatus of the second feature, the torque constant $K_m$ is from 0.025 to 0.04 Nm/A, preferably from 0.03 to 0.037 Nm/A, and the resistance of the motor $R_m$ is from 1.0 to 2.5 Ω, preferably from 1.3 to 2.2 Ω.

The eighth feature of the present invention is that, in the above electric-control-type throttle apparatus of the first feature, the specification parameters have values such that a differential coefficient of the operation time t expressed by the equation (1) with respect to the speed reducing ratio N is positive.

The ninth feature of the present invention is that, in the above electric-control-type throttle apparatus of the eighth feature, the speed reducing ratio N is from 9.8 to 10.8.

The tenth feature of the present invention is that the above electric-control-type throttle apparatus of the first feature further includes a detector for detecting the applied voltage E, a means for measuring the counter-electromotive force induced in the motor, and a control unit for controlling the motor, wherein the control unit predicts changes in the value obtained by dividing the sum of the detected applied voltage E and the measured counter-electromotive force by the impedance $R_m$ of the motor, and controls the applied voltage so as not to flow current beyond the permitted current value in the circuit used for driving the motor.

The eleventh feature of the present invention is to provide an electric-control-type throttle apparatus including a motor, a speed reducing mechanism for reducing the rotation speed that is transmitted from the rotation speed of the motor, a throttle valve connected to the speed reducing mechanism, and a force applying means for applying force to the throttle valve towards returning the valve to its initial position, and adjusting the opening of the throttle valve by driving the motor; wherein the specification parameters of the motor, and the force applying means have their values satisfying the following inequality (2):

$$R_m > \frac{(E + K_e \dot{\theta}_m)}{I_{\lim}}, \quad (2)$$

where $\dot{\theta}_m=\dot{\theta}_v \cdot N$, and $V_m=K_e\dot{\theta}_m$, and $R_m$ is the resistance of the motor [Ω], E: the voltage applied to the motor [V], $K_e$: the induction voltage coefficient [V/rpm], $\dot{\theta}_m$: the rotation speed of the motor [rpm], $\dot{\theta}_v$: the rotation speed of the throttle valve [rpm], N: the speed reducing ratio, and $V_m$: the counter-electromotive force induced in the motor.

The twelfth feature of the present invention is that, in the above electric-control-type throttle apparatus of the eleventh feature, the applied voltage E is approximately 13 V, and the motor impedance $R_m$ is more than 1.2 Ω at 20° C.

The thirteenth feature of the present invention is that the above electric-control-type throttle apparatus of the eleventh feature further includes a detector for detecting the applied voltage E and a control unit for controlling the motor, wherein the control unit predicts changes in the value of the right-hand side of the inequality (2) and controls the applied voltage E so as to always satisfy the inequality (2).

The fourteenth feature of the present invention is that, in the above electric-control-type throttle apparatus of the first to thirteenth features, the throttle apparatus is used in a direct-injection combustion engine.

DETAILED DESCRIPTION OF THE EMBODIMENTS

At Hereinafter, details of embodiments will be explained with reference to the drawings.

Figure 1:
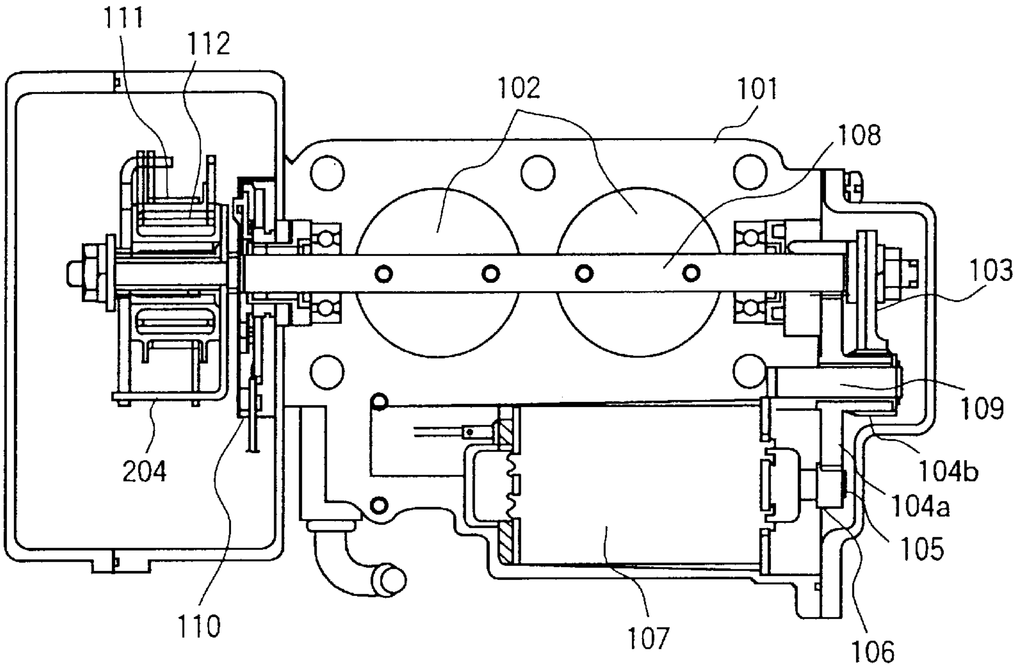
FIG. 1 is a horizontal section of an electric-control-type throttle apparatus of an embodiment according to the present invention.
Figure 8:
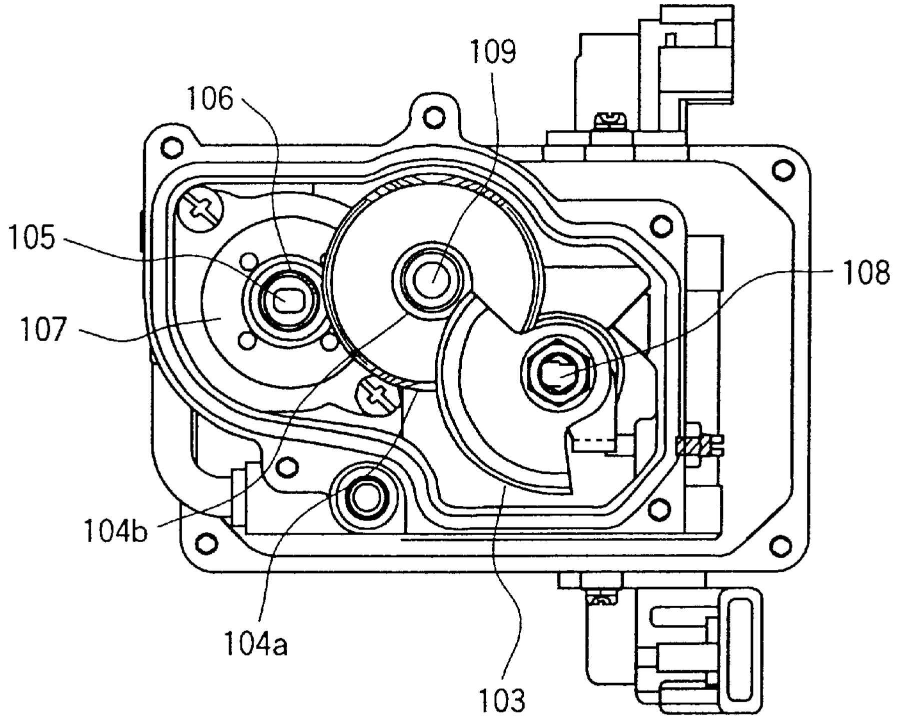
FIG. 8 is a front view of the electric-control-type throttle valve shown in FIG. 1, which is viewed from the direction of the shaft of the throttle valve.

FIG. 1 shows a horizontal section of an electric-control-type throttle apparatus of an embodiment according to the present invention, and FIG. 8 is a front view of a gear part in the electric-control-type throttle valve shown in FIG. 1, which is viewed from the direction of the shaft of the throttle valve.

The electric-control-type throttle apparatus comprises a throttle body 101 including an air intake path and a motor 107 generating the torque, a motor shaft 105 of the motor 107, a motor gear 106 fixed on the motor shaft 105, a large intermediate gear 104*a* engaged with the motor gear 106, a small intermediate gear 104*b* fixed on the motor shaft 105 coaxially with the large intermediate gear 104*a*, a valve gear 103 engaged with the small intermediate gear 104*b*, a valve shaft 108 on which the valve gear 103 is fixed, a throttle valve 102 screwed to the valve shaft 108, and a default mechanism using a return spring 111 and a default spring 112.

Specification parameters determining the performance of the electric-control-type throttle apparatus are indicated as follows. The specification parameters concerning the motor 107 are the torque constant, the counter-electromotive (induction) voltage constant, the motor inductance, the motor resistances, the voltage applied to the motor 107, etc. Moreover, the specification parameters concerning the mechanical composition are the moment of inertia, the speed reducing ratio (gear ratio), the preload torque of the return spring 111, and so on.

Furthermore, a throttle position sensor 110 for detecting the position of the throttle valve 102 is provided between the default mechanism and the throttle valve 102.

In order to reduce the rotation speed that is transmitted from the rotation speed of the motor 107 to the valve shaft 108, it is necessary to make the pitch circle diameter of the motor gear 106 smaller than that of the large intermediate gear 104 engaged with the motor gear 106. Also, it is necessary to make the pitch circle diameter of the small intermediate gear 104*b* smaller than that of the valve gear 103 engaged with the small intermediate gear 104*b*. Because the rotation angle of the throttle valve 102 is at most 90 degrees, it is sufficient that the valve gear 103 rotates for 90 degrees. Thus, the valve gear is formed as a fan shape.

The large and small intermediate gears 104*a* and 104*b* are formed by shaping the respective tooth spaces in the same member. A hole is made in the center of the intermediate gears 104*a* and 104*b*, and an intermediate gear shaft 109 is press-fitted through the hole in the throttle body 101. Moreover, in order to reduce the friction and backlashes in the intermediate gears 104*a* and 104*b*, a dry bearing is inserted between the intermediate gears 104*a* and 104*b*, and the intermediate gear shaft 109.

A flange is provided at the motor 107 vertically to the motor shaft 105, and is fixed to the throttle body 101 with two screws. In this embodiment, the large intermediate gear 104*a* is arranged in a position near the throttle body 101 on the intermediate gear shaft 109 so that the length of the motor shaft 105 is made as short as possible. By this arrangement, it is possible to use the motor shaft 105 of a small diameter because of the increased stiffness with the motor shaft 105. Consequently, the moment of inertia can be decreased, which improves the response of the throttle apparatus.

Figure 2:
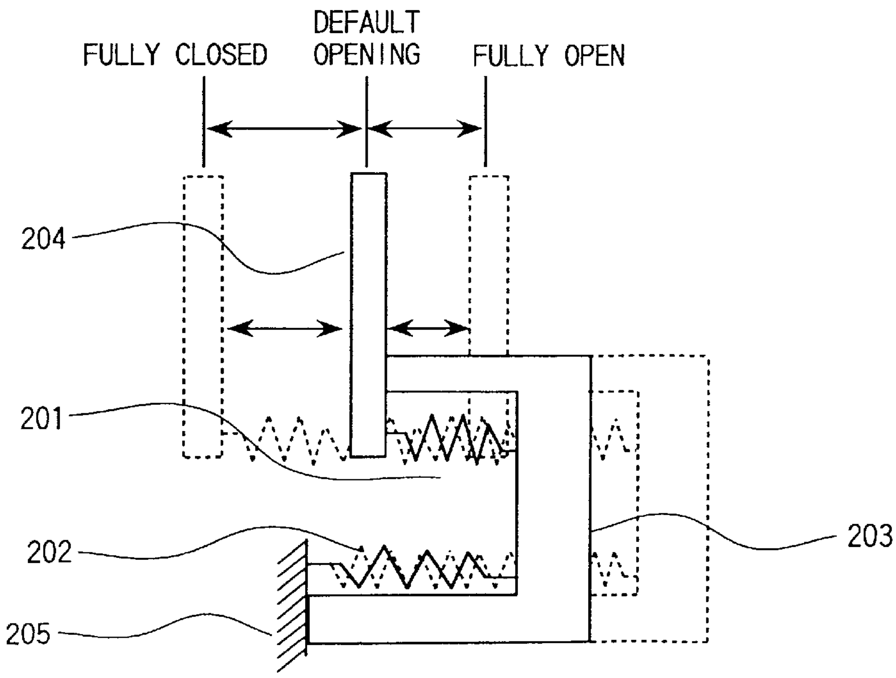
FIG. 2 is an illustration showing the principle of a default mechanism.

FIG. 2 is a illustration showing the principle of the default mechanism. In this figure, for simplicity of explanation, the principle is illustrated by imaging that the rotational motion of a lever 204, the return spring 201 (111), and the default spring 202 (112) is converted to the linear motion. The lever 204 is connected to the valve shaft 108, and is driven by the motor 107. When the lever 204 is moved left, the throttle valve 102 is driven in the valve opening direction. The default mechanism maintains the throttle valve 102 at the predetermined position (called the default position) by using a pair of springs. The default position is set as the position of the throttle valve, such that the vehicle can start without over-speeding. The return spring 201 (111) is attached to a member 203 and the lever 204 is connected to the throttle shaft 108. The default spring 202 (112) is attached to the member 203 and a body 205.

If the motor 107 stops, the lever 204 is pushed to the member 203 by the return spring 201, and the member 203 is maintained at the default position by the default spring 202. In the open-position range beyond the default position of the lever 204, the member 203 touches the body 205 and stops there, and the force is applied to the lever 204 by the return spring 201 in the valve closing direction. On the other hand, in the closed-position range below the default position of the lever 204, the force of the default spring 202 is applied to the throttle valve 102 via the lever 204 and the member 203.

Figure 3:
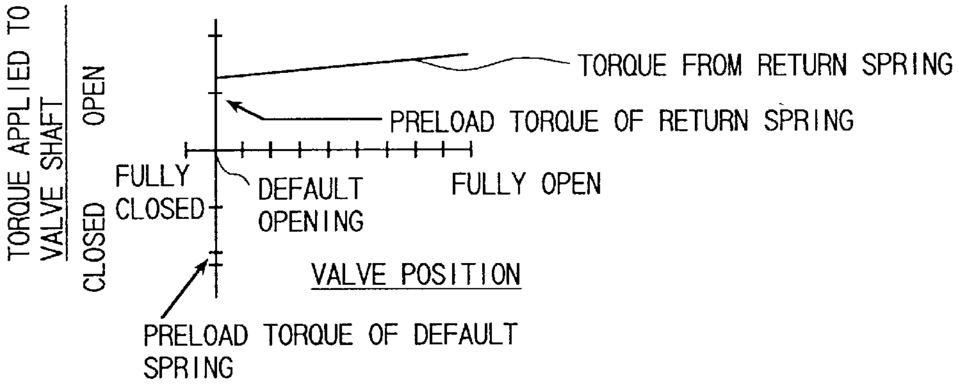
FIG. 3 is an illustration for showing the force applied to the shaft of a throttle valve by a return spring and a default spring.
Figure 4A:
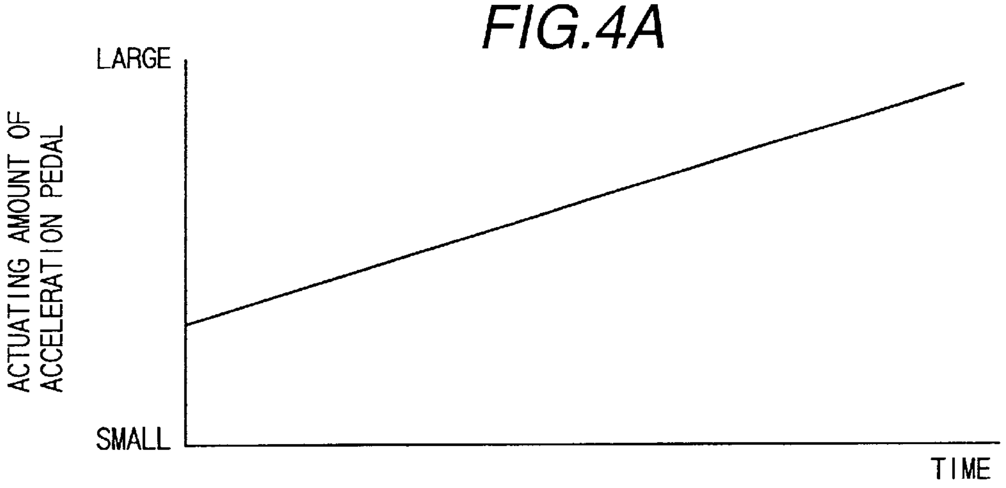
FIGS. 4A and 4B show operations of a throttle valve in an electric-control-type throttle apparatus, corresponding to changes in time of the actuating amount of an acceleration pedal.
Figure 4B:
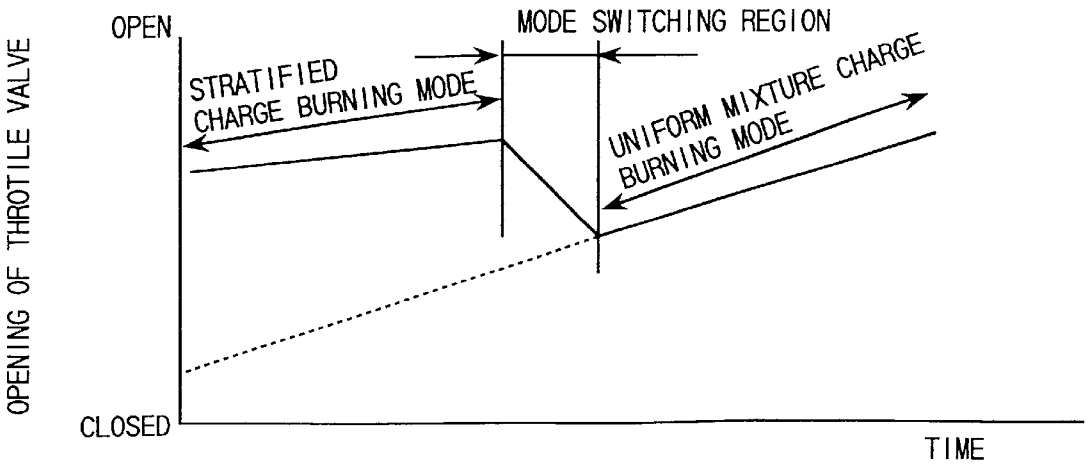

FIG. 3 is an illustration for showing the torque applied to the valve shaft 108 of the throttle valve 102 by the default mechanism using the return spring 111 and the default spring 112. The preload is applied to both the return spring 111 and the default spring 112 in advance. The optimal value therefore exists for each preload. If the preload is too large, it causes a long response time in the opening and closing operations of the throttle valve 102, and if the preload is too small, the throttle valve 102 cannot return to the default position, which is due to air resistance and friction in the rotation. The preload of the return spring 111 is important for reliably returning the throttle valve 102 to the default position, and the force of 30–40 kgfmm is necessary for the preload.

In the following, the operations of the electric-control-type throttle valve will be explained.

When torque larger than the spring force of the default mechanism is applied to the valve shaft 108 by the motor 107, the motor shaft 105 rotates, and the motor gear 106 and the large intermediate gear 104*a* also rotate according to the rotation of the motor shaft 105. Because the number of teeth on the motor gear 106 is less than that on the large intermediate gear 104*a*, the rotation speed of the motor 107 is reduced. The small intermediate gear 104*b* rotates together with the large intermediate gear 104*a*, and transmits the torque to the valve gear 103. Moreover, because the pitch circle diameter of the small intermediate gear 104*b* is set smaller than that of the valve gear 103, the rotation speed is further reduced. Thus, the rotation speed of the motor 107 is reduced by two steps, and is transmitted to the valve shaft 108.

Figure 6:
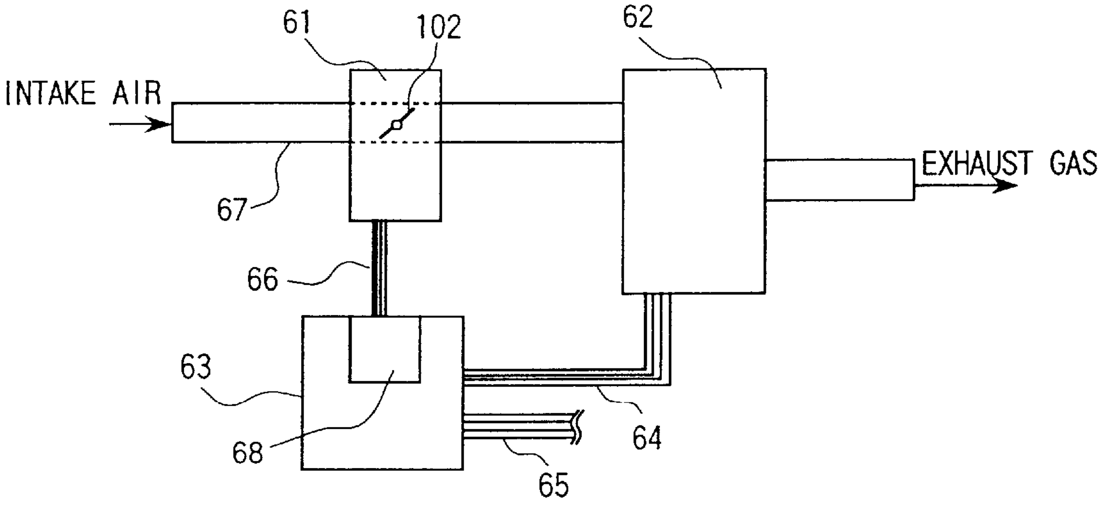
FIG. 6 is a schematic diagram showing the composition of a direct-injection engine using an electric-control-type throttle apparatus.

FIG. 6 shows an example of the composition of a direct-injection engine using the electric-control-type throttle apparatus of the present invention. The electric-control-type throttle apparatus 61 is arranged at the upper stream side of a direct-injection engine 62, in an air intake tube 67. A control unit 63 for sending control signals to the motor 107 and driving the motor 107 is connected to the electric-control-type throttle apparatus 61 via a throttle harness 66.

The control unit 63 receives information from the engine 62 via an engine harness 64, and from other parts of the vehicle via a harness 65, and determines the target position of the throttle valve 102. Moreover, the control unit 63 receives a position signal detected by the throttle position sensor 110 for detecting the position of the throttle valve 102, and controls the position of the throttle valve 102 so as to follow the determined target position.

A drive circuit 68 for adjusting the power fed to the motor 107 is incorporated in the control unit 63,. The drive circuit 8 uses the PWM method for controlling the torque generated by the motor 107 by feeding voltage pulses of the variable width to the motor 107. Transistors or FETs (Field Effect Transistor) are used as switching elements to generate the voltage pulses, and the permitted current is assigned to those transistors. If a current larger than the permitted current flows in those switching elements of the transistors or FETs, the transistors possibly break down.

In Table 1, specification parameters of the motor 107 and the gear ratio of the speed reducing mechanism in this embodiment are shown. By using the specification parameters shown in Table 1, it is possible to ensure that the response time of the electronic throttle apparatus is reduced and the overcurrent flowing in the drive circuit is

TABLE 1

| | | 20° C. | 120° C. | −30° C. |
|---|---|---|---|---|
| Torque constant | kgfmm/A | 3.54 | 3.07 | 3.76 |
| | Nm/A | 0.0347 | 0.0301 | 0.0368 |
| Counter-electromotive force | V/krpm | 3.65 | 3.18 | 3.92 |
| Motor impedance | Ω | 1.61 | 2.24 | 1.29 |
| Preload of | kgfmm | 36 | 36 | 36 |
| return spring | Nm | 0.353 | 0.353 | 0.353 |
| Speed-reducing ratio | — | 10.27 | 10.27 | 10.27 |

These specification parameters are explained below.

When the voltage is applied to a motor 107, and the motor 107 begins to rotate, the motor 107 generates the induced voltage in the direction opposite that of the applied voltage, which is due to the power generating function which the motor 107 possesses. This induced voltage is called the counter-electromotive force, and is proportional to the rotation speed of the motor. Because the motor 107 used in the electric-control-type throttle apparatus is controlled so that the position of the throttle valve follows the target position, when the position approaches the target position, voltage is applied to the motor 107 to generate torque for the reverse rotation of the motor 107 so as to reduce the rotation speed of the motor 107. In this operation of the motor 107, the counter-electromotive force is further added to the applied voltage, and the overcurrent flow may occur in the drive circuit of the motor 107.

Figure 14:
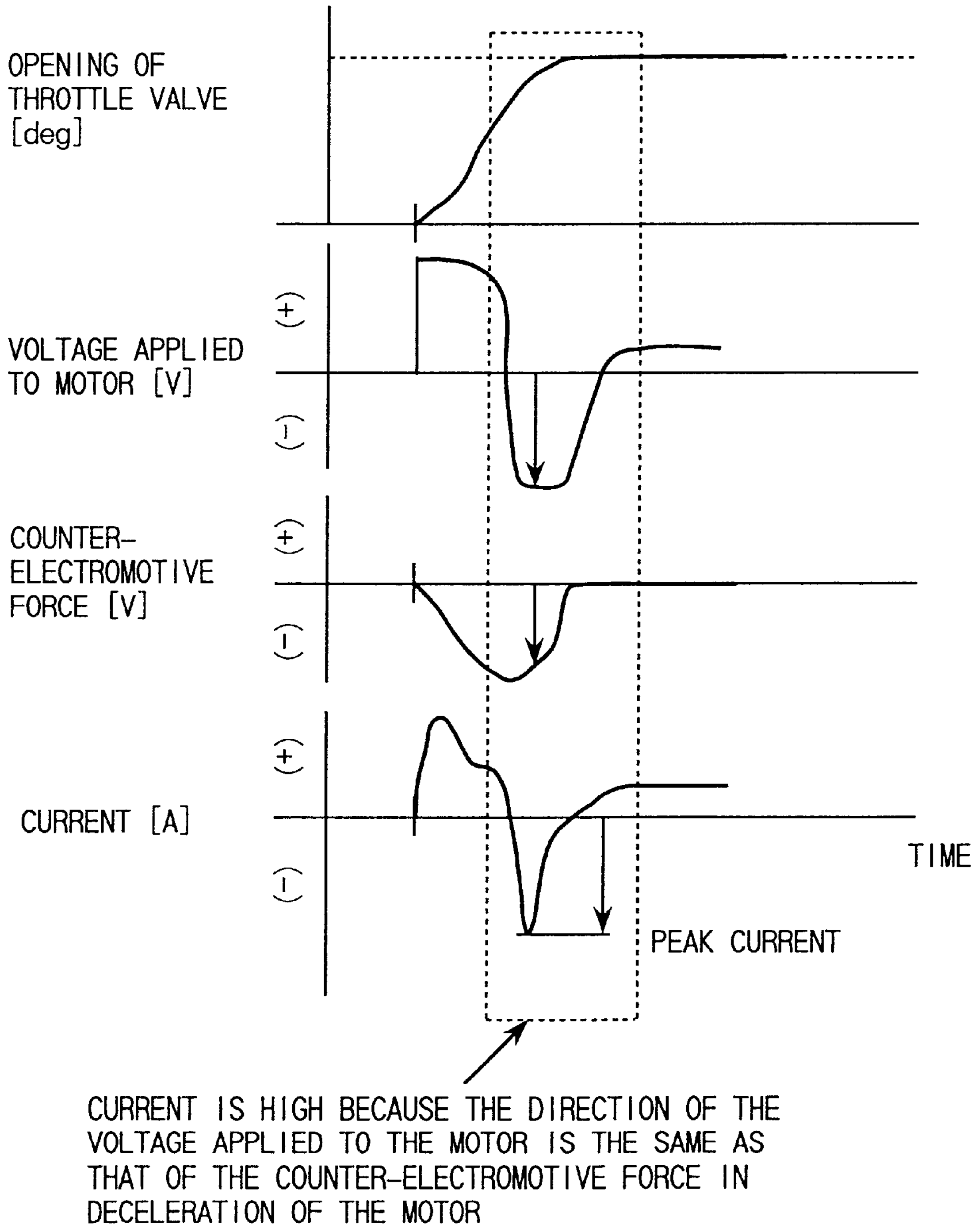
FIG. 14 shows the induced counter-electromotive force and the current flowing in the motor used in the electric-control-type throttle apparatus.

For example, FIG. 14 shows the induced counter-electromotive force and the current flow in the motor 107 used in the electric-control-type throttle apparatus.

Figure 10:
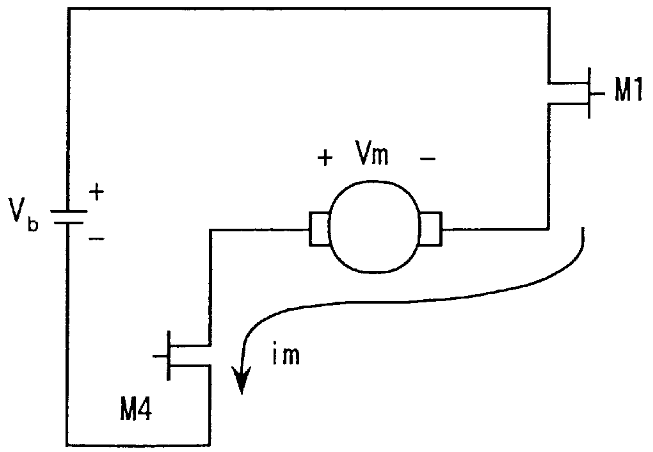
FIG. 10 is a conceptual diagram showing a current flow path when voltage is applied to the motor to cause the torque in a direction inverse to that of the present rotation of the motor.
Figure 9A:
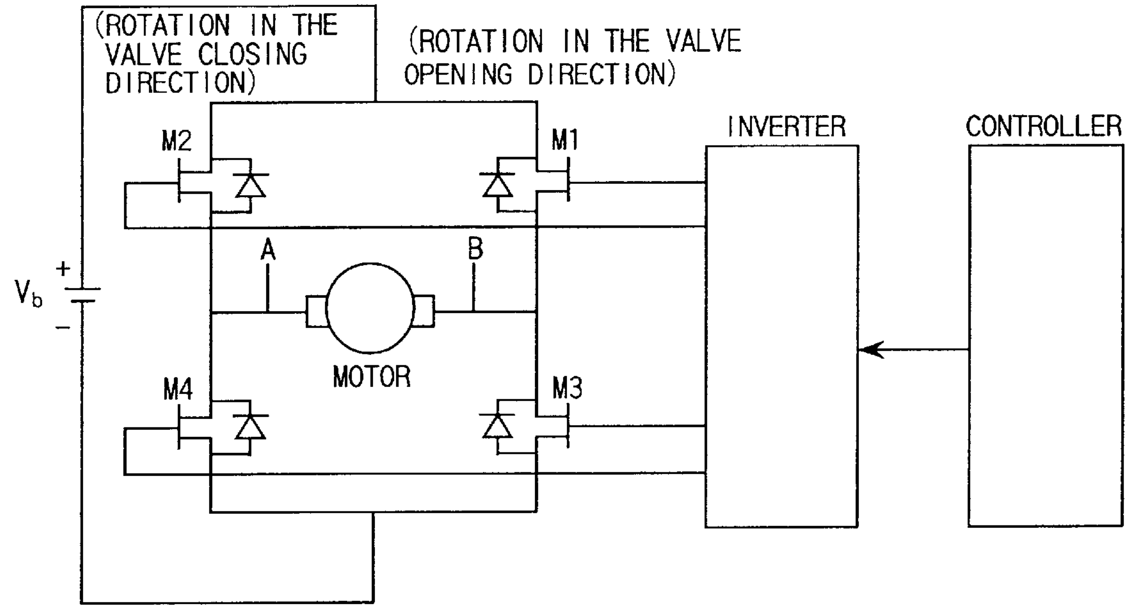
FIGS. 9A and 9B show a drive circuit for driving the motor and voltage pulse patterns applied to the drive circuit, respectively.
Figure 9B:
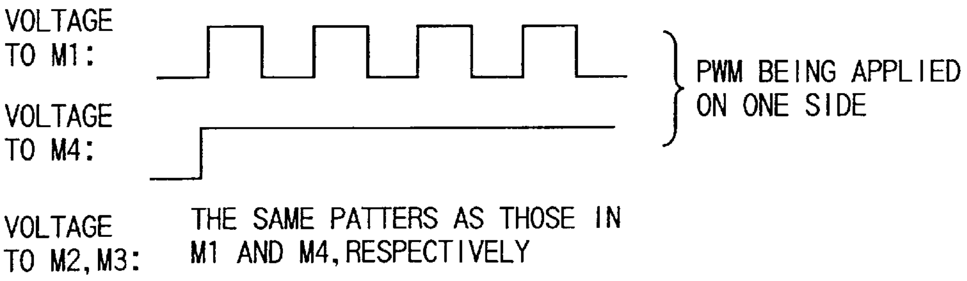

In FIGS. 9A and 9B respectively, a schematic diagram of the composition of the drive circuit 68, and an example of the voltage pulse pattern applied to the switching elements are shown. Moreover, FIG. 10 shows the voltage generated at the motor 107 and the current flow in the switching elements of the drive circuit when the voltage is applied to the motor 107 to generate torque for the reverse rotation of the motor 107. M1, M2, M3, and M4 indicate the switching elements using FETS, and turn current fed to the motor 107 on or off. By turning on M1 and M4 (M2 and M3 being turned off), the motor 107 is rotated in the forward (valve opening) direction. On the other hand, in turning on M2 and M3 (M1 and M4 being turned off), the motor 107 is rotated in the reverse (valve closing) direction. When the motor 107 rotates in the reverse direction, the counter-electromotive force of the motor 107 is generated in the direction in which the side A of the motor 107 is positive. In order to rapidly decelerate the reverse rotation speed of motor 107, the voltage in the forward direction is applied to the motor 107 by turning on M1 and M4 as shown in FIG. 10. Consequently, the direction of the generated counter-electromotive force $V_m$ coincides with that of the applied voltage $V_b$ (E), and the current $i_m$ flows in M1 and M4. The flowing current is larger by the amount of the current generated by the counter-electromotive force $V_m$ than the current generated by only the applied voltage $V_b$. If the current $i_m$ exceeds the permitted value of the switching elements M1, M2, M3, and M4 that is, the current $i_m$ is overcurrent, and the switching elements M1 and M4 possibly break down.

In this embodiment, by adequately setting the impedance of the motor 107, overcurrent flow in the drive circuit 68 and the motor 107 due to the counter-electromotive force can be prevented.

The impedance of the motor 107 is determined so as to satisfy the above-described inequality (2). The inequality (2) is again described below.

$$R_m > \frac{(E + K_e\dot{\theta}_m)}{I_{lim}}, \tag{2}$$

where $\dot{\theta}_m=\dot{\theta}_v\cdot N$, and $V_m=K_e\dot{\theta}_m$, and $R_m$ is the motor impedance [Ω], E: the voltage applied to the motor 107 [V], $K_e$: the induction voltage constant [V/rpm], $\dot{\theta}_m$: the rotation speed of the motor 107 [rpm], $\dot{\theta}_v$: the rotation speed of the throttle valve 102 [rpm], N: the speed-reducing ratio, and $V_m$ the counter-electromotive force induced in the motor 107.

The right-hand side of the inequality (2) expresses the resistance obtained by dividing the sum of the applied voltage $V_b$ and the counter-electromotive force $V_m$ by the permitted current $I_{lim}$.

This impedance $R_m$ is the impedance between A and B shown in FIG. 9A, that is, both terminals of the motor 107, including not only the armature impedance of the motor 107, but also the impedance of a choke coil used as a noise filter and the brush resistance.

Furthermore, the resistance component of the impedance is obtained by measuring current flowing in the motor 107 when the voltage (13 V in this embodiment) is applied and the motor 107 has stalled. Hereafter, concerning the impedance of the motor 107, the resistance component is mainly considered ($R_m$ is described as the resistance).

If the resistance $R_m$ does not satisfy the inequality (2), the resistance $R_m$ is an insufficient value, and the current flowing in the drive circuit 68 may exceed its permitted value. In determining the adequate value of the resistance $R_m$, the right-hand side of the inequality (2) is conservatively estimated at the temperature of −30° C. at which the resistance $R_m$ has the minimal value in the assumed temperature range of the vehicle operation. That is, the right-hand side of the inequality (2) is estimated by using parameters expressing the characteristics of the motor 107 at the temperature −30° C. The rotation speed $\theta_v$ is defined as the speed 187.5 rpm in rotating the throttle valve from 0 degree to 90 degree ($\pi/2$) by 80 ms.

Furthermore, in this embodiment, the gear ratio N is 10.28, and the induction voltage constant $K_e$ is 3.92 V/krpm. The applied voltage E is almost 13 V, which is generated by a battery ordinarily used in a vehicle. Although the voltage of the battery is controlled so as to be in the range of 12.7–12.8 V, sometimes the power decreases below 10 V a vehicle is started, or in the dissipated state of the battery. Moreover, the voltage of the battery sometimes increases to over 16 V due to the malfunction of a battery voltage control apparatus. However, in estimating the right-hand side of the inequality (2), the voltage 13 V usually used in an engine of a vehicle is used. Also, as the permitted current of the switching elements in the drive circuit 68 of the motor 107, 20 A is used. By substituting the above values into the right-hand side of the inequality (2), it is found that the resistance $R_m$ of more than 1.03 Ω satisfies the inequality (2). Furthermore, because it can occur by an error in production that the resistance $R_m$ takes a 5% lower value, and the induction voltage constant $K_e$ takes a 10% higher value than the nominal value, the right-hand side of the inequality (2) is estimated taking the above error into account. Thus, by using the increased value 4.31 V/krpm for the induction voltage constant $K_e$, the resistance $R_m$ is estimated as a value higher than 1.12 Ω. Thus, in this embodiment, the resistance $R_m$ is conservatively set as 1.3 Ω.

In the above-mentioned example, the operation time in which the throttle valve 102 is driven from the minimum opening to the maximum opening is set as 80 ms. In order to determine the resistance $R_m$ more precisely, the following method can be used. That is, the operation time t of the throttle valve 102 is obtained by using the above-described equation (1) (as the parameters expressing the characteristics of the motor 107, their values at not 120° C. but −30° C. are used), and the resistance $R_m$ can be also determined with the rotation speed $\theta_v$ of the valve 102 calculated by using the above-obtained operation time t. By using this method of determining the resistance $R_m$, the breakdown of the switching elements in a drive circuit can be prevented even in an electric-control-type throttle apparatus in which the operation time t is much shorter than 80 ms. However, in the above method, because the parameters of the motor at −30° C. are used, it may occur that the determined resistance $R_m$ is too large at the operating temperature, which in turn decreases the current flowing in the motor 107 too much, and the output torque of the motor 107 becomes insufficient. Consequently, the response of the electric-control-type throttle apparatus deteriorates. Moreover, the delay effect of a control system is not considered in the equation (1). If the very quick response of the electric-control-type apparatus is intended, this delay effect cannot be neglected.

Figure 5A:
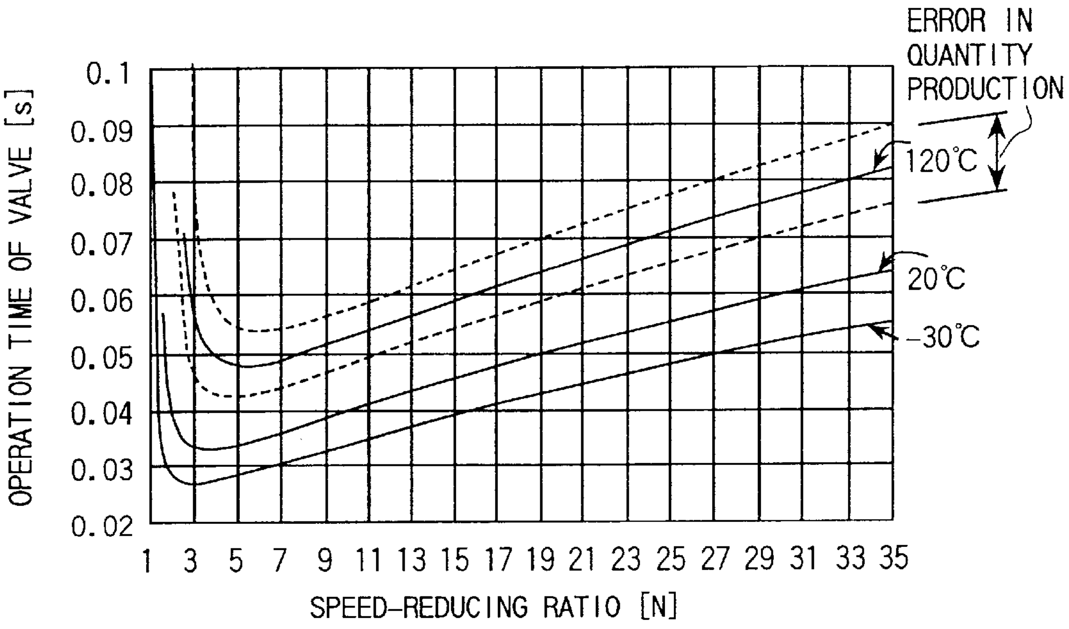
FIGS. 5A and 5B show the relationship between the operation time t, and the speed reducing ratio and temperature, respectively.

Accordingly, it is more appropriate that the necessary resistance $R_m$ at 20° C. is determined with the inequality (2) by using the operation time t of the valve 102, which is obtained by using the equation (1) in which the parameters expressing the characteristics of the motor 107 at 20° C. are used. As for the operation time t of 40 ms (375 rpm), it is seen in FIG. 5A that the adequate gear ratio N is about 10 at 20° C. Consequently, the resistance $R_m$ at 20° C., satisfying the inequality (2), is estimated as more than 1.35 0. Furthermore, by taking the error of the quantity production into account, it is preferable to set the resistance $R_m$ as more than 1.49 Ω. In this embodiment, the resistance $R_m$ at 20° C. is more conservatively set at 1.61 Ω.

According to the above method of determining the resistance $R_m$, the current flowing in the motor 107 and its drive circuit 68 is restricted so as not to exceed the permitted value, and it is possible to reduce the probability of the breakdown of the switching elements in the drive circuit 68 without using a complicated circuit or control method.

Other methods in which the value of the right-hand side of the inequality (2) is always monitored and the applied voltage is controlled so as to satisfy the inequality (2) are also effective in preventing the breakdown of the switching elements. A system for implementing the above method is shown in FIG. 6. In one of the above methods, a control circuit 63 calculates the rotation speed of the motor 107 based on the change rate in time of the target opening, and monitors and predicts the value of the right-hand side of the inequality (2). Moreover, it controls the voltage applied to the motor 107 so as to satisfy the inequality (2). If the rotation speed of the motor 107 is high and the value of the right-hand side of the inequality (2) is predicted to exceed the value satisfying the inequality (2), the sum of the applied voltage $V_b$ (E) and the counter-electromotive force $V_m$ is decreased by decreasing the applied voltage, particularly when it begins to apply the reverse voltage to the motor 107. In another one of the above methods, the voltage between the terminals A and B of the motor 107 (counter-electromotive force) is monitored, and the control circuit 63 always calculates the sum of the applied voltage $V_b$ (E) and the counter-electromotive force $V_m$. Moreover, if the rotation speed of the motor 107 is high and the value of the right-hand side of the inequality (2) is predicted to exceed the value satisfying the inequality (2), the control circuit 63 stops applying the voltage to the motor 107. In another of the above methods, the control circuit 63 always monitors the value obtained by dividing the sum of the applied voltage $V_b$ (E) and the counter-electromotive force $V_m$ by the resistance $R_m$, and if the value is predicted to exceed the permitted current, the control circuit 63 stops applying voltage to the motor 107 briefly, and then start applying voltage to the motor 107 again.

Each of the above-mentioned methods can be implemented by a simple circuit, and because it is not necessary to use a motor of a large resistance Rm, the heat (joule heat) generated in the coils of the motor 107 can be reduced. Moreover, because it is possible to always flow current at a level near the permitted current, the operation time of a throttle valve 102 can also be reduced.

As for the gear ratio, it is set as 10.28 in this embodiment. By using this gear ratio, it becomes possible not only to secure the stable response of the electric-control-type throttle apparatus, which is not affected by the dispersion in the characteristics of the motor 107 and the spring force of the default mechanism or by load torque changes due to the deposit on the throttle valve 102, but also to operate the throttle valve 102 at a relatively high speed.

Meanwhile, the gear ratio 10.28 is determined by the tooth numbers of the respective motor gear 106, large intermediate gear 104*a*, small intermediate gear 104*b*, and valve gear 103 shown in FIG. 1 and FIG. 8. The respective tooth numbers are 21, 65, 22, and 73 (this value is converted to the all-around tooth number) for motor gear 106, the large intermediate gear 104*a*, the small intermediate gear 104*b*, and the valve gear 103 respectively. It is not always necessary to use those tooth numbers for implementing the present invention. Moreover, the target gear ratio cannot be always precisely realized. The reason is that the tooth number of a gear depends on the distance between the shaft of each gear and that of a gear or gear module neighboring the gear, and those distances are also restricted by the size of each gear. Therefore, it is practical to set the gear ratio in the range of 9.80 to 10.78, which is determined by taking the variation caused by one tooth in the teeth of each gear into account rather than to set the ratio at one value of 10.28.

In the electric-control-type throttle apparatus, if the gear ratio is set low, it is difficult to stably operate the throttle apparatus because the spring force of the default mechanism becomes large relative to the torque of the motor 107, which makes the change in the operation time sensitive to the change of the torque of the motor 107. Furthermore, the equivalent moment of inertia of the throttle valve 102 to be driven by the motor 107 becomes relatively large, which degrades the response of the throttle apparatus.

Conversely, if the gear ratio is set high, it takes more time to accelerate the motor 107 because it is necessary to rotate the motor 107 at a high speed in order to obtain the quick response of the throttle apparatus. Thus, the response of the throttle apparatus is deteriorated, which is not preferable for a direct-injection engine.

Figure 11:
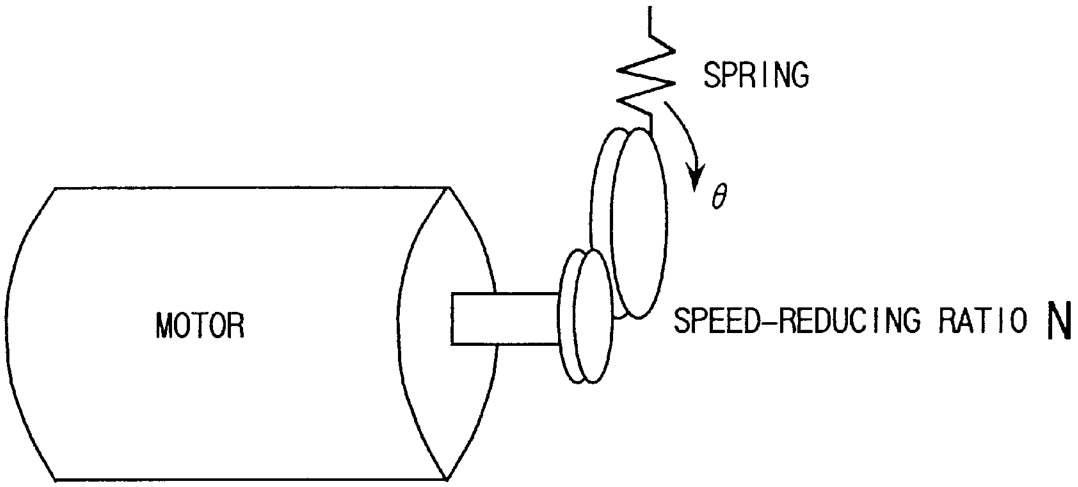
FIG. 11 is a diagram for explaining the motion of the electric-control-type throttle apparatus.
Figure 12:
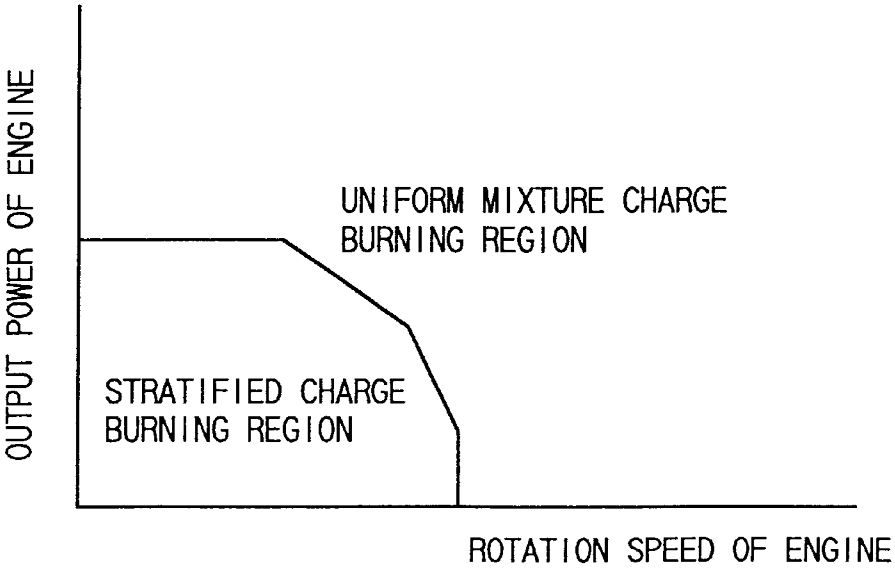
FIG. 12 is a diagram showing the relationship between the fuel burning modes and operation states of an engine.

FIG. 11 shows an illustration to explain the motion of the electric-control-type throttle apparatus. When the motor 107 generates the torque $T_m$, the gears rotate and reduce the rotation speed that is transmitted from the rotation speed of the motor 107 to the valve shaft 108 by the degree of the ratio N, and rotates the throttle valve 102 to which the spring load $T_s$ is applied. Equations of motion in a system shown in FIG. 11 are expressed by the following equations (3):

$$\left.\begin{aligned} J\ddot{\theta}_v + T_s &= T_m N \\ \mathrm{To} &= K_m I \\ L_m \dot{I} + R_m I + K_e N \dot{\theta}_v &= E \end{aligned}\right\}, \qquad (3)$$

where $_{To}$: the torque of the motor [Nm], $K_m$: the torque constant [Nm/A], I: current flow in the motor [A], and $L_m$: the inductance of the motor [H].

The above equations (3) express the mechanical motion, the torque generated in the motor, and the voltage relation, respectively. It is seen that smaller values of the moment of inertia J, the inductance $L_m$, the resistance $R_m$, and the preload torque $T_s$ of the return spring 111 move the throttle valve more quickly. Thus, the values of the torque constant $K_m$, the induction voltage constant $K_e$, and the gear ratio N should be optimized.

The gear ratio N used in this embodiment is determined so as to realize the stable and quick operation of the electric-control-type throttle apparatus. To determine this gear ratio N, the equation (1) is used. The equation (1) is again described below.

$$t = \sqrt{\frac{\pi}{\frac{(T_{\max} N - T_s)}{J}}}, \qquad (1)$$

where $T_{max}=K_m E/R_m$, and $T_z$: the preload of the return spring 111 of the force applying means [Nm], $T_{max}$: the torque of the motor 107 [Nm], N: the speed-reducing ratio, J: the equivalent moment of inertia [kgM$^2$], $K_m$: the torque constant [Nm/A], $R_m$: the resistance of the motor 107 [Ω], in and E: the voltage applied to the motor 107 [V].

The equation (1) is obtained by neglecting both the inductance $L_m$ that slightly affects the motion of the system, and the transient effects in the motion of the motor 107, assuming that the torque so approximately reaches the maximum value $T_{max}$=; and by integrating the equations (3). Although the equation (1) is an approximate equation which does not include the delay effect of a control system, the response performance of the control system can be designed to be sufficiently quick if a mechanical system can be operated quickly enough. Therefore, in this embodiment, the equation (1) expresses a value close to the accurate operation time t of the throttle valve 102.

In estimating the operation time t by using the equation (1), it is assumed that the throttle valve 102 is rotated by the angle π/2 from the minimum opening to the maximum opening. Because the torque generated by the motor 107 decreases when the temperature of the motor 107 increases, the values at 120° C. concerning the parameters are used in the right-hand side of the equation (1) by assuming that this electric-control-type throttle apparatus is left in the environment of 120° C. for a long time and that the temperature of the apparatus reaches its equilibrium state. As the moment of inertia J, the equivalent moment is used: that is, the moment obtained by combining and converting the moment of inertia of the motor 107 and the moment of inertia of the respective gears into one lump of moment of inertia attached to the valve shaft 108. Also, the value 13 V which is the voltage of an ordinarily used battery is used as the applied voltage,.

To realize the high speed operation of the electric-control-type throttle apparatus, it is desirable that the operation time t estimated by the equation (1) is less than 80 ms. Because the characteristics of the motor 107 cannot be freely changed, the operation time t is adjusted by changing the gear ratio N, based on the selected specification parameters of the motor 107. In the following, the gear ratio (speed-reducing ratio) will be explained. FIG. 5A shows the relationship between the operation time t estimated by using the equation (1) and the gear ratio (speed-reducing ratio). From this figure, it is seen that the operation time t gradually changes in the range of the gear ratio N from 2.5 to 32. On the other hand, the operation time t rapidly changes below the gear ratio 2.5, and the stable operation of the throttle valve 102 becomes difficult because the spring load of the return spring 111 becomes relatively large. In the range of the gear ratio of 2.5 to 5, the change in the operation time t is sensitive to the change in the gear ratio. This situation is similar to the change in the load of the motor 102. That is, the operation time t mainly changes relative to small changes in the load. Two dotted lines shown in FIG. 5A indicate the best and worst estimated operation times t when the induction voltage constant $K_e$ and the resistance $R_m$ of the motor at 120° C. change by 10% and 5%, respectively, which are caused by an error in the quantity production. From those lines, the change in the operation time t is sensitive also to changes in the characteristic parameters of the motor 107 below the gear ratio 5.

Figure 5B:
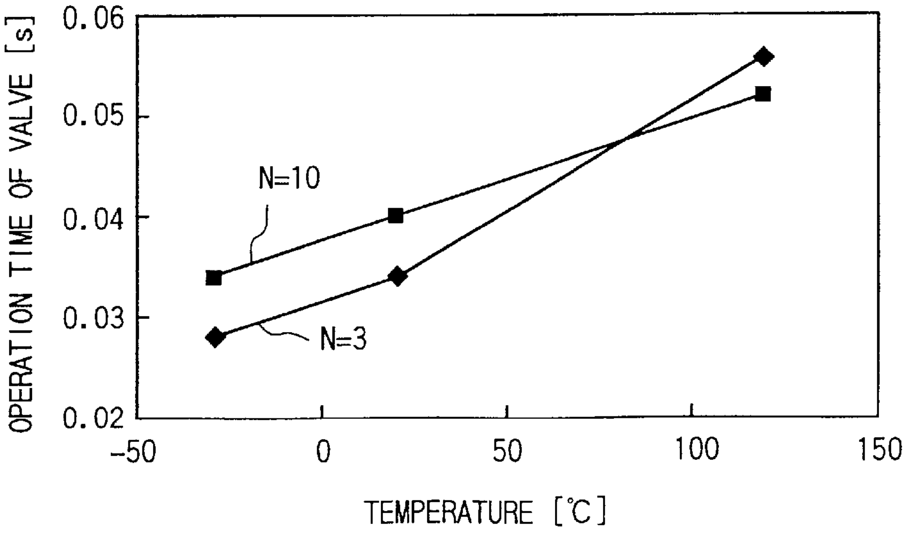

FIG. 5B shows changes in the operation time t corresponding to changes in the temperature at the gear ratios 3 and 10. The gradient of the line at the gear ratio 3 is larger than that at the gear ratio 10, that is, the change in the operation time t at the gear ratio 10 is less sensitive to a change in the temperature than that at the gear ratio 3. The lower sensitivity to the temperature is more favorable for controlling the throttle apparatus because control becomes easier. Therefore, the control performance at the gear ratio 10 is superior to that at the gear ratio 3. The specification parameters which change correspondingly with the change in the temperature are mainly the torque constant and the resistance of the motor 107. Accordingly, if the temperature is high, the torque generated in the motor 107 is small, and vice versa. Furthermore, the change in the temperature can be replaced with the change in the torque generated in the motor. Consequently, it can be said that, at the small gear ratio, the change in the operation time t is large relative to the change in the torque generated by the motor 107 (the change in the temperature). Considering the small gear ration from another view point, because the small gear ratio means that the torque transmitted to the valve shaft 108 of the throttle valve 102 is small, it can be also said that the operation time t becomes sensitive to a change in the load applied to the valve shaft 108 if the gear ratio is small. Thus, the large gear ratio brings the stable operation time t, and is advantageous to the control of the electric-control-type throttle apparatus. In showing the dependency of the operation time t on the temperature in FIG. 5B, the values 3 and 10 of the gear ratio are selected as typical values. The gear ratio 3 is in the region of the negative gradient of lines expressing the dependency of the operation time on the gear ratio shown in FIG. 5A, and the gear ratio 10 is in the region of the positive gradient of those lines shown in FIG. 5A. As shown by the line at the gear ratio 3 in FIG. 5B, the tendency in which the operation time t largely changes along with the change in the temperature occurs in the negative region of those lines shown in FIG. 5A. Therefore, in determining the gear ratio, it is desirable to select the gear ratio in the region of the positive gradient of those lines in FIG. 5A, in which the operation time t is comparatively insensitive to the change in the temperature (namely, torque and load).

In this embodiment, the gear ratio is determined within the range of the positive gradient of those lines shown in FIG. 5A. It is because, as mentioned above, the change in the operation time t is small relative to the change in the load or the change in the characteristics of the motor 107 in this region of the gear ratio and the stable operation of the throttle valve 102 can be maintained.

By selecting the above-mentioned gear ratio, when the electric-control-type throttle valve of the present invention is applied to a direct-injection engine, it is possible to realize a quick response with only minimal changes in the output power of the engine even when switching the burning mode.

Figure 7:
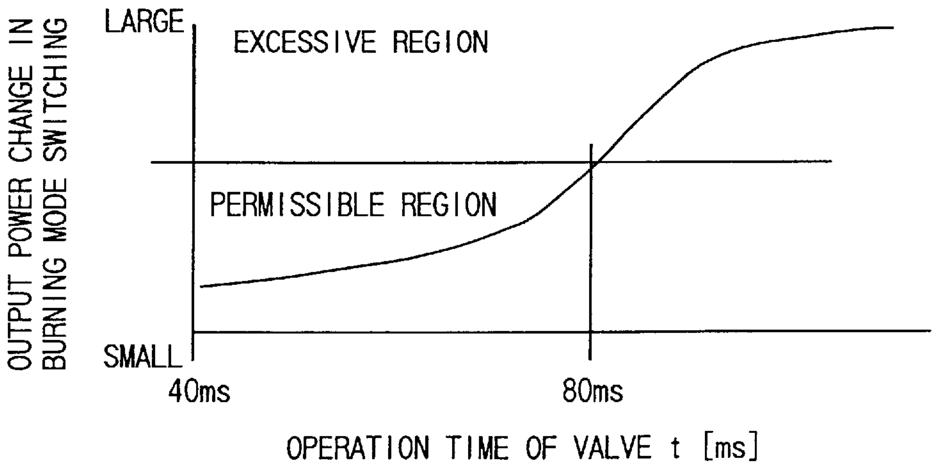
FIG. 7 is a diagram showing changes of the output power of a direct-injection engine when the fuel burning mode is switched.

In FIG. 7, output power changes in a direct-injection engine, which occur when switching the burning mode, are shown with respect to the operation time t. From this figure, it is seen that the output power changes when switching the burning mode are comparatively low in the range below the operation time of 80 ms. The reason will be explained in the following.

Figure 13:
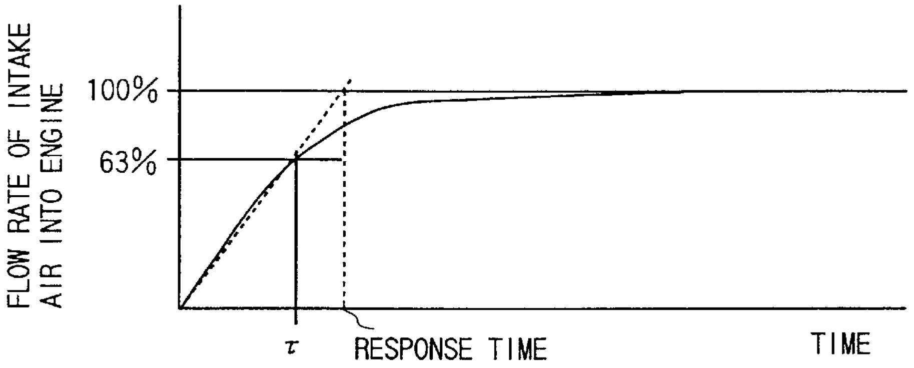
FIG. 13 shows a delay in the response of the intake air flow rate to a step change of the opening of a throttle valve.

The electric-control-type throttle apparatus 61 of this embodiment is arranged in the upper stream of the air intake pipe of the engine 62 as shown in FIG. 6. Therefore, even if the throttle valve 102 is driven rapidly, the actual flow rate of the intake air into the engine 62 is delayed by the volume of a manifold part from the exit of this throttle apparatus 61 to the entrance of the engine 62. Thus, even if the throttle valve 102 is instantaneously driven from the fully open state to the fully closed state within, for example, 10 ms, the flow rate of the intake air into the engine 62 does not instantaneously become 0, but gradually decreases to 0. In FIG. 13, the change in the flow rate of the intake air in instantaneously opening the throttle valve 102 from the fully closed state to the fully open state is shown until the flow rate reaches the rated value 100%. The delay time τ depends on the ratio of the volume of the manifold part of the air intake pipe to the engine swept volume and the rotation speed $N_e$ of the engine 62, and this delay time τ is obtained by the following equation (4):

$$\tau=120\cdot V_{man}/(V_d\cdot N_e) \quad (4),$$

where $V_{man}$: the volume of the manifold part from the exit of this throttle apparatus 61 to the entrance of the engine 62 [L], $V_d$: the engine swept volume [L], and $N_e$: the rotation speed of the engine 62.

The ratio of the $V_m/V_d$ is generally about 0.8–1.5. The delay time τ is defined as the time at which the flow rate reaches the value of 63% of the rated flow rate, and the response time at which the flow rate effectively reaches 100% is defined as the time at which the dotted line connecting the original point and the point of 63% intersects the horizontal line of 100% in FIG. 13. The response times are calculated by varying the ratio $V_m/V_d$ and the rotation speed $N_e$. Results of the calculation are summarized in Table 2.

Switching the burning mode in a direct-injection engine is carried out within the range of 2000 rpm to 3000 rpm. In this range, the minimum response time necessary for the flow rate to reach time under the conditions of Ne: 3000 rpm and the ratio $V_m/V_d$: 0.8 is 51 ms, and the maximum response time under the conditions of Ne: 2000 rpm and the ratio $V_m/V_d$: 1.5 is 143 ms.

TABLE 2

| Rotation speed $N_e$ of engine [rpm] | The ratio of the air intake pipe volume to the engine swept volume [$V_{man}/V_d$] | | | |
|---|---|---|---|---|
| | 0.8 | 1.0 | 1.2 | 1.5 |
| 1000 | 0.152* | 0.190 | 0.229 | 0.286 |
| 1500 | 0.102 | 0.127 | 0.152 | 0.190 |
| 2000 | 0.076 | 0.095 | 0.114 | 0.143 |
| 2500 | 0.061 | 0.076 | 0.091 | 0.114 |
| 3000 | 0.051 | 0.063 | 0.076 | 0.095 |
| 4000 | 0.038 | 0.048 | 0.057 | 0.071 |
| 5000 | 0.030 | 0.038 | 0.046 | 0.057 |

*the unit is [s]

However, it is rare for the burning mode to be switched near the rotation speed 3000 rpm, and the ratio $V_m/V_d$ is usually more than 1.0. Therefore, the operation time of the throttle valve 102 is preferably set less than 100 m when applying the throttle apparatus to a direct-injection engine in which the burning mode is switched near the rotation speed 2000 rpm. If the throttle apparatus can realize the operation time t of less than 80 ms, it can be applied to almost all direct-injection engine. In this embodiment, the ratio $V_m/V_d$ is about 1.0, and the rotation speed when switching the burning mode is about 2500 rpm. By using the electric-control-type throttle apparatus, the operation time of 80 ms is almost equal to the response time of the flow rate in the lower stream region (manifold part) of the air intake pipe. Thus, because the flow rate of the intake air into the engine 62 can be controlled at a high speed, the change in the output power of the engine 62 can be reduced as shown in FIG. 7.

Furthermore, in the electric-control-type throttle valve, it is a characteristic particular to this type of throttle apparatus that the throttle valve must be released from its sticking state due to the soil deposit caused by the adhesion of gum-state substances. Especially in this embodiment which does not use the pedal operation transmission mechanism in which the throttle valve 102 is directly driven by a wire connected to the acceleration pedal operated by a driver, the sticking state of the throttle valve 102 must be released by only the torque of the motor 107. Although the sticking force varies depending on the operation environment of the throttle valve 102, if the torque of more than 110 kgfmm can be applied to the shaft of the throttle valve 102, this torque is sufficient to release almost all of the assumed sticking states.

The excess quantity of the torque which can be applied to the valve shaft 108 beyond the preload torque of the return spring 111 at the default position of the throttle valve 102 is called the sticking release torque. That is, the sicking release torque is the difference between the torque applied to the valve shaft 108 by the motor 107 and the preload torque of the return spring 111. The gum-state substances causing the sticking state of the throttle valve 102 are softened at a high temperature. On the other hand, because the maximum torque generated by the motor 107 increases when the temperature decreases, it is appropriate to estimate the sticking release torque at the ordinary temperature (20° C.). Moreover, it is assumed that the sticking of the throttle valve 102 occurs during a long-term stoppage of the vehicle, for example, parking for a long time, which possibly causes the decrease of the voltage $V_b$ of the battery. Therefore, as the voltage $V_b$ of the battery, the value of 10 V is used to conservatively estimate the sticking release torque brought by the motor 107. In this embodiment, the maximum torque generated by the motor 107 is 21.9 kgfmm at the applied voltage E of 10 V, the gear ratio N is 10.3, and the preload torque of the return spring 111 is 36 kgfmm. Therefore, the sticking release torque (190 kgfmm) applied to the valve shaft 108 is larger by about 80 kgfmm than the necessary sticking release torque 110 kgfmm. Therefore, the sticking release torque is sufficiently secured in this embodiment, and the electric-control-type throttle apparatus of this embodiment is powerful against the sticking of the throttle valve 102, which improves the reliability the throttle apparatus.

Figure 15:
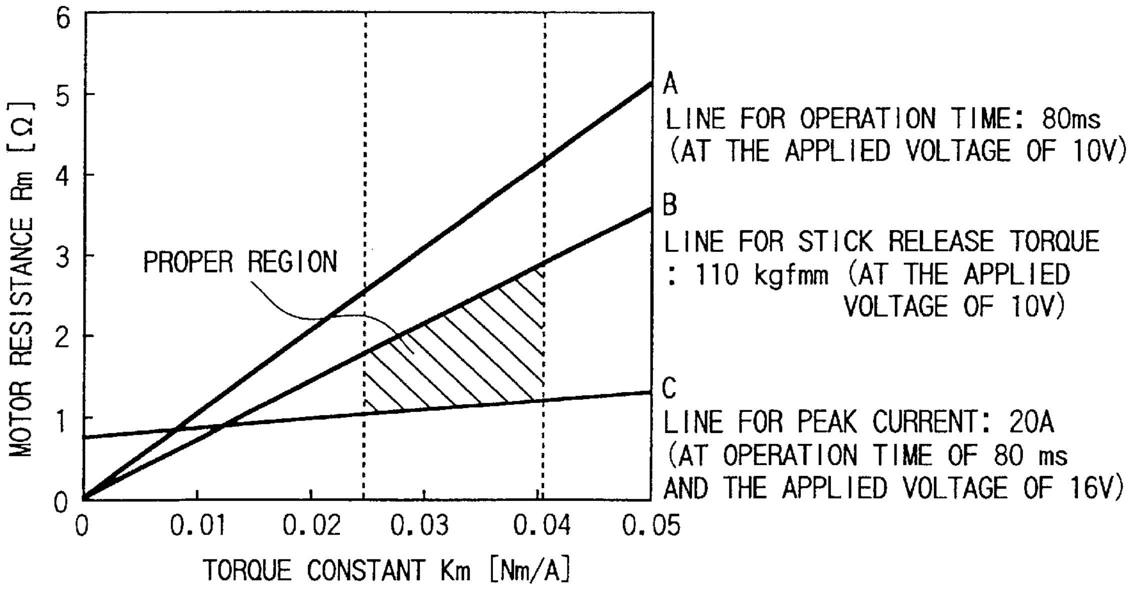
FIG. 15 shows the relationship between the limit values of the motor resistance and the values of the torque constant under the condition of each value of the operation time of 80 ms, the necessary sticking release torque of 110 kgfmm, and the permitted current of 20 A, in which the equivalent moment J of inertia is set 0.0013 $kgm^2$.

FIG. 15 shows the relationship between the limit values of the motor resistance $R_m$ and the values of the torque constant $R_m$ under the conditions of each value at the operation time of 80 ms, the necessary sticking release torque of 110 kgfmm, and the permitted current of 20 A. The equivalent moment of inertia J is set as 0.0013 $kgm^2$.

In FIG. 15, the solid line A indicates the upper limit values of the motor resistance $R_m$ such that the operation time of the throttle valve 102 is less than 80 ms. It is desirable to set the torque constant $K_m$ and the motor resistance $R_m$ as values in the lower side region of the line A. The solid line C indicates the lower limit values of the motor resistance $R_m$ such that the peak current flow in the motor 107 is less than the permitted current 20 A. Accordingly, it is desirable to set the torque constant $R_m$ and the motor resistance $R_m$ as values in the upper side region of the line C. Consequently, it is desirable to set the torque constant $K_m$ and the motor resistance $R_m$ as values in the region between the lines A and C. As to the torque constant $K_m$, because the electromagnetic force of the motor 107 should be increased to satisfy the value of greater than 0.04 Nm/A, which increases its production cost and its size, the value of less than 0.04 Nm/A is desirable although it is possible to set the torque constant $K_m$ to a value of more than 0.04 Nm/A . On the other hand, if the torque constant $K_m$ is less than 0.025 Nm/A, it is necessary to have a large current flow in the motor 107, and the influence of the production error of the motor resistance $R_m$ becomes relatively large. Therefore, the region surrounded by a pair of dotted lines and the line A and C is a desirable region to set the torque constant $K_m$ and the motor resistance $R_m$.

Furthermore, the upper limit values of the motor resistance $R_m$ such that the sticking release torque is more than 110 kgfmm are indicated by the line B in FIG. 15. In order to secure a sticking release torque of more than 110 kgfmm, it is necessary to set the torque constant $K_m$ and the motor resistance $R_m$ in the lower region of the line B. Thus, the shadowed region surrounded by a pair of dotted lines and the line A and C becomes a more appropriate region to set the torque constant $K_m$ and the motor resistance $R_m$. In this embodiment, taking the error in the production into account, the torque constant $K_m$ and the motor resistance $R_m$ are set within 0.03–0.037 Nm/A and within 1.29–2.24 Ω, respectively.

As a typical example of the specification parameters for the electric-control-type throttle apparatus, in this embodiment, the following values are set: that is, the torque constant e of 0.035±0.0035 Nm/A, the motor resistance $R_m$ of 1.61±0.08 Ω, and the speed-reducing ratio N of 10.3 (9.8–10.8). Moreover, by setting the preload torque of the return spring 111 at 0.35 (0.3–0.4) Nm, the operational safety of the vehicle to which the electric-control-type throttle valve of the present invention is applied is secured because the position of the throttle valve 102 is automatically returned to the predetermined opening position even if the motor 107 fails.

By using the electric-control-type throttle apparatus of the present invention, it is possible to operate the throttle valve 102 at a high speed, which can reduce the change in the output power of the engine 62 even when switching the burning mode from the stratified charge burning mode to the uniform mixture charge burning mode in the direct-injection engine. Furthermore, it is possible to prevent the overcurrent flow in the drive circuit 68 when operating the throttle valve 102 at a high speed that is, the burning of the switching elements in the drive circuit 68 can be prevented, which improves the fail-safe performance of the throttle apparatus.

Although the voltage 13 V is used as the applied voltage E in the above embodiments, other values of the applied voltage E are applicable.

We claim:

1. An electrically-controlled throttle valve apparatus including a motor, a speed reducing mechanism for reducing the rotation speed that is transmitted from said motor, a throttle valve connected to the speed reducing mechanism, force applying means for applying a force to the throttle valve in the direction of returning said throttle valve to an initial position, and a motor-drive circuit for driving said motor, wherein impedance between terminals of said motor is set to a value such that a value of current which flows in said motor-drive circuit in a throttle valve-deceleration operation is less than a permitted value for electrical elements comprising said motor-drive circuit.

2. An electrically-controlled throttle valve apparatus according to claim 1, wherein a resistance component of said impedance is 1.6±0.1 0 Ω at 20° C.

3. An electrically-controlled throttle valve apparatus according to claim 1, wherein a torque constant of said motor is 0.035±0.0035 Nm/A at 20° C.

4. An electrically-controlled throttle valve apparatus according to claim 1, wherein the voltage applied to said motor is substantially 13 V.

* * * * *